United States Patent
Sartorius et al.

(10) Patent No.: US 12,492,021 B2
(45) Date of Patent: Dec. 9, 2025

(54) MODULAR UNMANNED AERIAL VEHICLE AIRFRAME WITH STRUCTURALLY INTEGRATED YOKE AND PAYLOAD ASSEMBLY

(71) Applicant: Skydio, Inc., Redwood City, CA (US)

(72) Inventors: Thomas Skyler Sartorius, Los Angeles, CA (US); Calder Richmond Hughes, Portland, OR (US); Julian Rene Alvarez, San Francisco, CA (US); Sean David-Andrew Belardo, San Francisco, CA (US)

(73) Assignee: Skydio, Inc., San Mateo, CA (US)

( * ) Notice: Subject to any disclaimer, the term of this patent is extended or adjusted under 35 U.S.C. 154(b) by 241 days.

(21) Appl. No.: 17/314,794

(22) Filed: May 7, 2021

(65) Prior Publication Data

US 2021/0339861 A1   Nov. 4, 2021

Related U.S. Application Data

(63) Continuation of application No. 15/712,526, filed on Sep. 22, 2017, now Pat. No. 11,014,666.

(60) Provisional application No. 62/399,173, filed on Sep. 23, 2016.

(51) Int. Cl.
| | |
|---|---|
| *B64U 20/50* | (2023.01) |
| *B64C 3/18* | (2006.01) |
| *B64U 10/25* | (2023.01) |
| *B64U 30/14* | (2023.01) |
| *B64U 50/13* | (2023.01) |
| *B64U 50/19* | (2023.01) |

(52) U.S. Cl.
CPC .............. *B64U 20/50* (2023.01); *B64C 3/187* (2013.01); *B64U 10/25* (2023.01); *B64U 30/14* (2023.01); *B64U 50/13* (2023.01); *B64U 50/19* (2023.01); *B64C 2211/00* (2013.01); *B64U 2201/20* (2023.01)

(58) Field of Classification Search
CPC ........ B64C 2201/021; B64C 2201/042; B64C 2201/06; B64C 2201/104; B64C 2201/123; B64C 2201/127; B64C 2201/165; B64C 2211/00; B64C 1/26; B64C 3/187; B64U 20/50; B64U 30/14; B64U 10/25
See application file for complete search history.

(56) References Cited

U.S. PATENT DOCUMENTS

| | | | |
|---|---|---|---|
| 1,910,611 A * | 5/1933 | Kinner | ...................... B64C 3/56 244/49 |
| 2,360,220 A | 10/1944 | Goldman | |
| 2,388,380 A | 11/1945 | Bathurst | |
| 3,640,491 A | 2/1972 | Harrison | |

(Continued)

FOREIGN PATENT DOCUMENTS

CN          101792022 A   *   8/2010

*Primary Examiner* — Philip J Bonzell (57) ABSTRACT

Disclosed here are unmanned aerial vehicle embodiments including some embodiments having a fuselage, tail, and wings including example embodiments with an adaptable payload section, alternatively or additionally, modular flight surfaces including tail, wings and motor, alternatively or additionally the vehicle configured for short landings with reversible thrust, alternatively or additionally, the unmanned aerial vehicle configured with direct connection to moveable flight control surfaces.

20 Claims, 8 Drawing Sheets

(56) References Cited

U.S. PATENT DOCUMENTS

| | | | |
|---|---|---|---|
| 4,535,958 A * | 8/1985 | Hutchison | B64C 1/26 |
| | | | 248/225.11 |
| 6,926,235 B2 | 8/2005 | Ouellette et al. | |
| 7,237,750 B2 | 7/2007 | Chiu et al. | |
| D596,267 S | 7/2009 | Colgren et al. | |
| 7,699,261 B2 | 4/2010 | Colten et al. | |
| 7,922,115 B2 | 4/2011 | Colgren et al. | |
| 8,317,130 B1 | 11/2012 | Westman | |
| 8,660,712 B2 | 2/2014 | Grabowsky et al. | |
| 8,939,810 B1 | 1/2015 | Suknanan | |
| 8,967,526 B2 | 3/2015 | Karem | |
| 9,221,532 B2 | 12/2015 | Karem | |
| 9,493,226 B2 | 11/2016 | Karem | |
| 9,505,484 B1 | 11/2016 | Al-Sabah | |
| 9,902,489 B2 * | 2/2018 | Fisher | B64C 39/024 |
| 10,196,143 B2 | 2/2019 | Quinlan et al. | |
| 10,227,129 B2 * | 3/2019 | Fisher | B64C 5/06 |
| 10,377,482 B2 | 8/2019 | Gibboney et al. | |
| 11,554,847 B2 * | 1/2023 | Stepura | B64U 20/50 |
| 2005/0029400 A1 | 2/2005 | Ouellette et al. | |
| 2006/0091258 A1 | 5/2006 | Chiu et al. | |
| 2008/0149758 A1 | 6/2008 | Colgren et al. | |
| 2008/0210818 A1 | 9/2008 | Chiu et al. | |
| 2011/0046821 A1 | 2/2011 | Grabowsky et al. | |
| 2012/0292435 A1 | 11/2012 | Karem | |
| 2014/0231593 A1 | 8/2014 | Karem | |
| 2014/0312169 A1 | 10/2014 | Fisher et al. | |
| 2016/0075423 A1 | 3/2016 | Karem | |
| 2017/0066532 A1 | 3/2017 | Karem | |
| 2017/0349281 A1 | 12/2017 | Quinlan et al. | |
| 2018/0265193 A1 | 9/2018 | Gibboney et al. | |
| 2019/0210724 A1 | 7/2019 | Bublitsky | |
| 2020/0156785 A1 | 5/2020 | Gibboney et al. | |

\* cited by examiner

MODULAR UNMANNED AERIAL VEHICLE AIRFRAME WITH STRUCTURALLY INTEGRATED YOKE AND PAYLOAD ASSEMBLY

CLAIM OF BENEFIT TO PRIOR APPLICATIONS

This application is a continuation of U.S. patent application Ser. No. 15/712,526, filed Sep. 22, 2017, which claims the benefit of and priority to U.S. Provisional Patent Application Ser. No. 62/399,173, filed Sep. 23, 2016, the entire contents of each of the above-identified applications being hereby incorporated by reference.

TECHNICAL FIELD

This application relates to the field of aviation and flying machines.

BACKGROUND

Previously, airframes were limited in their ability to carry payloads, land on short runways, and replace component parts to adapt to changing environments. This was especially true for fixed wing and rotary model aircraft, remote controlled, and drone aircraft. The standard fuselage was used for each and every circumstance which limited the usefulness of the aircraft and minimized the ability for customization.

SUMMARY

Systems and methods here include systems and methods including unmanned aerial vehicles including a transverse rigid frame yoke member, the member having first and second distal ends, a top portion, front portion, aft portion, and bottom portion, a tail member receptacle affixed to the aft portion of the transverse rigid frame yoke member, a first wing rib attached to the first distal end, and a second wing rib attached to the second distal end, wherein the first and second wing rib each include a wing attachment assembly, a payload assembly, attached to the front portion of the transverse rigid frame yoke member, the payload assembly including, a payload receptacle mounted in the payload assembly, wherein the payload receptacle is configured to mount with a battery pack.

Systems and methods may also include, alternatively or additionally, an unmanned aerial vehicle, including, a transverse rigid frame yoke member, the member having first and second distal ends, a top portion, front portion, aft portion, and bottom portion, a tail member receptacle affixed to the aft portion of the transverse rigid frame yoke member, wherein the tail member receptacle is detachably connected to a tail boom and tail assembly, the tail assembly having two fixed flight surfaces and two movable flight control surfaces, a first wing rib attached to the first distal end, and a second wing rib attached to the second distal end, wherein the first and second wing rib each include a wing attachment assembly, a first and second free wing section detachably connected to the respective first and second wing rib attachment assemblies, a motor mount assembly affixed to a front of the payload assembly, an electric motor detachably fixed to the motor mount assembly, wherein the electric motor includes a detachable propeller assembly, a payload assembly, attached to the front portion of the transverse rigid frame yoke member.

Systems and methods may also include, alternatively or additionally, an unmanned aerial vehicle, including, a fuselage detachably affixed to a tail section, wherein the fuselage includes a transverse rigid frame yoke, the yoke having first and second distal ends, a top portion, front portion, aft portion, and bottom portion, a first wing attached to the first distal end, and a second wing attached to the second distal end, a motor mount assembly affixed to a front of the payload assembly, an electric motor detachably fixed to the motor mount assembly, wherein the electric motor is configured to spin in two rotational directions, wherein the electric motor includes a detachable propeller assembly, a payload assembly, attached to the front portion of the transverse rigid frame yoke member, an onboard computer with a processor and a memory attached to the fuselage, the computer in communication with the electric motor, a radio antenna affixed to the fuselage, the radio antenna in communication with the onboard computer configured to receive instruction from a wireless control station, a location positioning system affixed to the fuselage, the location positioning system in communication with the onboard computer, configured to send location data to the onboard computer, a distance measuring system affixed to the fuselage, the distance measuring system in communication with the onboard computer, configured to send distance data to the onboard computer, wherein the onboard computer is configured to command the electric motor to reverse spin after receiving data from the distance measuring system and the location positioning system and the wireless controller station via the radio antenna.

Systems and methods may also include, alternatively or additionally, an unmanned aerial vehicle, including a transverse rigid frame yoke member, the member having first and second distal ends, a top portion, front portion, aft portion, and bottom portion, a tail member receptacle affixed to the aft portion of the transverse rigid frame yoke member, wherein the tail member receptacle is detachably connected to a tail boom and tail assembly, the tail assembly having, two fixed flight surfaces connected by a fulcrum, and two movable flight control surfaces mounted on the two fixed flight surfaces, at least two servo motors mounted in the fulcrum and each attached to a paddle, wherein the paddle is directly mounted to the movable flight control surfaces, a first wing rib attached to the first distal end, and a second wing rib attached to the second distal end, wherein the first and second wing rib each include a wing attachment assembly, a first and second free wing section detachably connected to the respective first and second wing rib attachment assemblies, a motor mount assembly affixed to a front of the payload assembly, an electric motor detachably fixed to the motor mount assembly, wherein the electric motor includes a detachable propeller assembly, a payload assembly, attached to the front portion of the transverse rigid frame yoke member.

BRIEF DESCRIPTION OF THE DRAWINGS

For a better understanding of the embodiments described in this application, reference should be made to the Detailed Description below, in conjunction with the following drawings in which like reference numerals refer to corresponding parts throughout the figures.

DETAILED DESCRIPTION

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the invention to these particular embodiments.

Overview

Fixed wing drone or model, remote controlled aircraft have utilized the same configuration for all intended uses. This configuration included a fuselage body, two wings rigidly attached and a tail with a horizontal and vertical stabilizer. Such an arrangement limited the usefulness of the aircraft, as only certain kinds of features could be strapped onto the bottom of the fuselage and wired into the aircraft.

Additionally, the component parts used to make up the flight surfaces were permanently affixed to the fuselage, making transportation and customization difficult.

With the advent of the disclosures here, remote or drone aircraft may utilize many different configurations of flight surfaces, configure a payload section to suit the needs of a particular mission, and be able to land in a short runway, making the aircraft more adaptable.

It should be noted than the unmanned aerial vehicle embodiments disclosed herein may include features such as an onboard computer with a processor, memory, data storage and connections to peripheral devices. Such a computer may run software that interacts with various portions of the unmanned aerial vehicle such as but not limited to the motor, movable flight control surfaces, payload capable of functioning, and any of various peripheral devices used to pilot the vehicle. The example embodiments may also include wireless communication features capable of communication with a wireless ground station, but in some examples, also capable of communicating with other features within the vehicle itself For example, the onboard computer may communicate with a camera in the payload section and instruct it to take an image, all wirelessly. The onboard computer may instruct a servo motor in the tail section to move a flight control surface to turn the vehicle in flight. These and other examples are disclosed below in more detail.

Modular Flight Surface Examples

Figure 1:
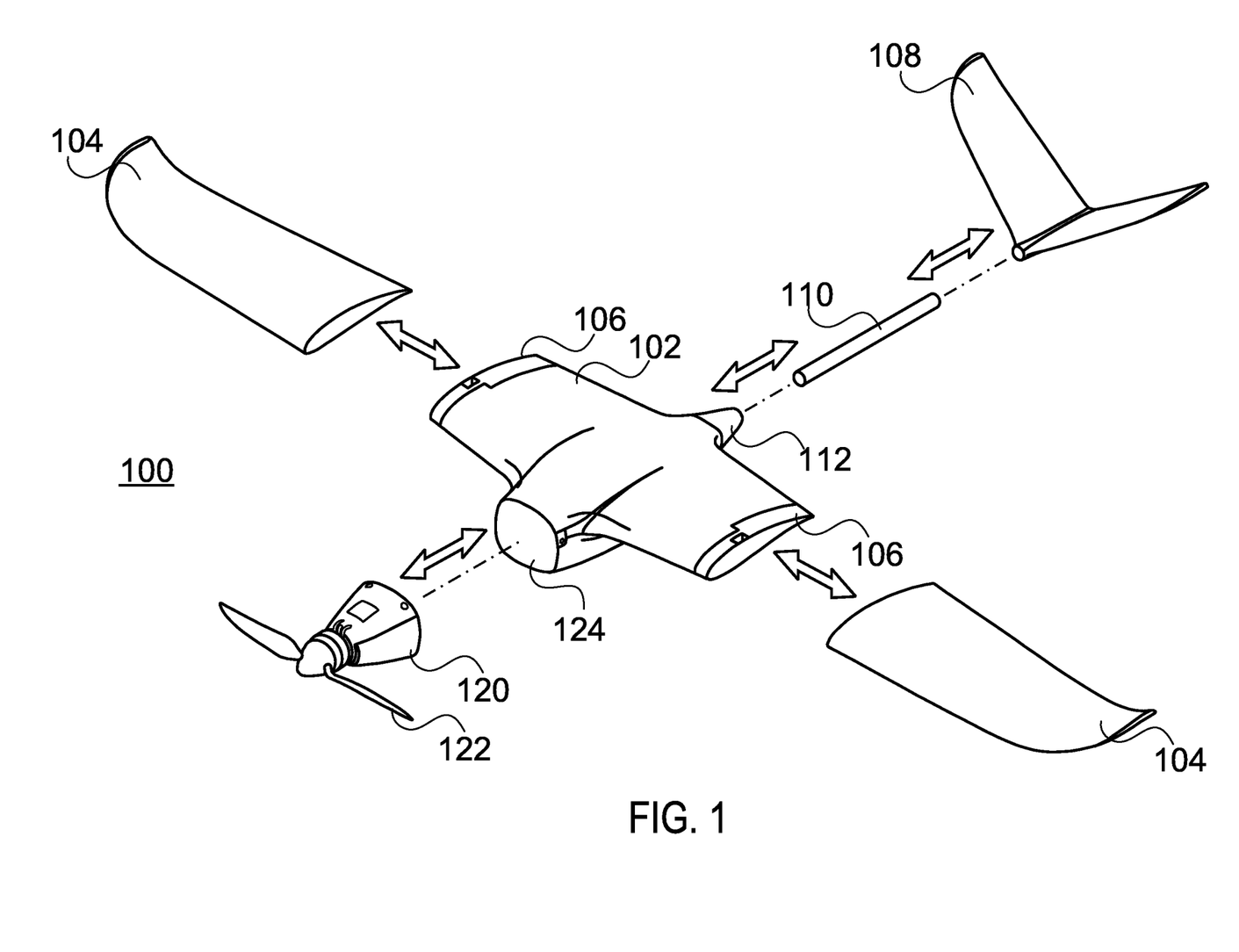
FIG. 1 is a perspective illustration of an exploded fixed wing aircraft according to some embodiments described here.

FIG. 1 shows an exploded perspective view of an aircraft airframe 100. The airframe 100 includes major component parts such as a main fuselage 102, free wing sections 104, a tail section 108 and a motor-propeller assembly 120, 122. The free wing sections 104 are shown connecting to the fuselage 102 by a quick connect adapter 106. The quick connect adapter is the subject of a patent application 62/385, 495 filed on 9 Sep. 2016, all of which is incorporated herein by reference. The tail section 108 is shown connected to the fuselage 102 by a tail boom 110 and a tail connector 112. The motor 120 is shown connected to the fuselage 102 by a motor connector 124.

The ability for a user to swap and replace component sections of the airframe 100 may have many uses. In some examples, the main fuselage 102 may be retained but the wings 104 and tail 108, 110 may be replaced with shorter or longer sections, making the overall airframe 100 smaller or larger, depending on its mission. If the airframe is to be used for a long time loiter mission, taking photos over a long time or distance, it may be useful to install long wings 104, a long tail boom 100, and a large tail 108. Such items may provide more lift for the aircraft 100 and enable the aircraft to use less fuel/battery. In some examples, a large aircraft may not be desirable for a particular use. In that case, a user may replace the wings 104, tail boom 110, and tail 108 sections with shorter component parts. These shorter component parts may enable the aircraft 100 to be more maneuverable in flight, and thereby provide the user with a faster, more agile platform.

Figure 10A:
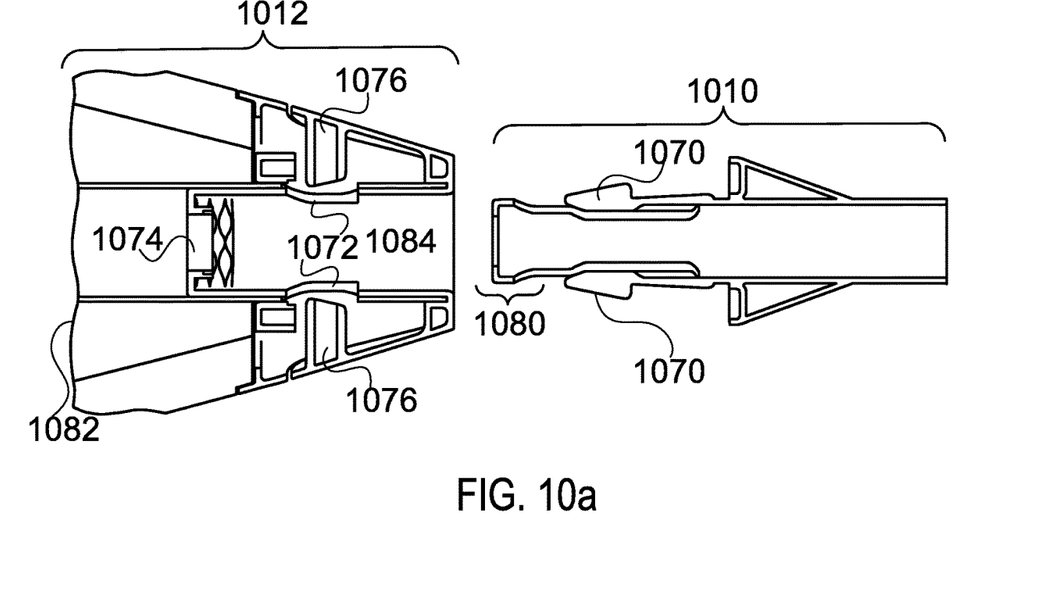
FIGS. 10a and 10b are cut away illustrations of an aircraft tail section attachment according to some embodiments described here.
Figure 10B:
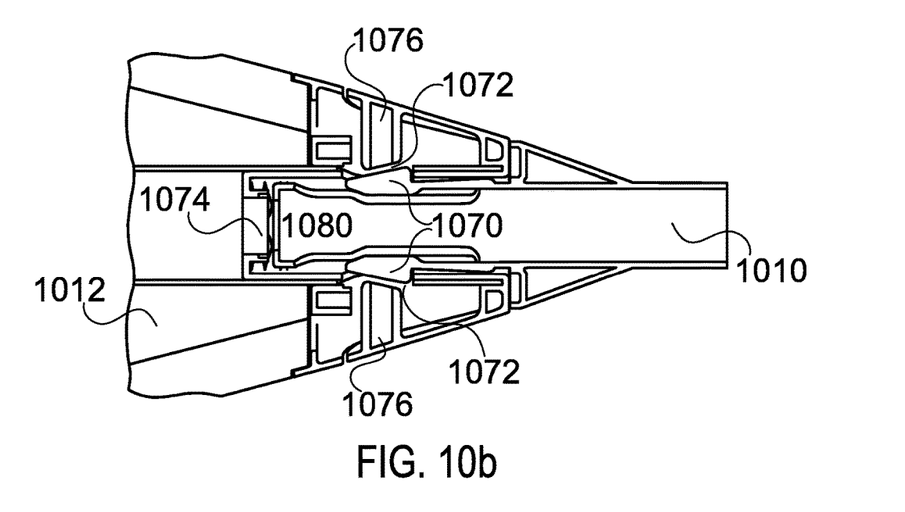

It should be noted that the tail connector 112 which mates with the tail boom 110 may be any of various interchangeable sections. The tail connector 112 may use a threaded screw connector, a click connector, snap connector, magnetic connector, or other various connector types to attach the tail boom 110 to the fuselage 102. FIGS. 10a and 10b describe some embodiments of tail connectors below. Similarly, the tail section 108 may attach to the boom 110 using any of various connectors.

Similar to the ability to change the flight control surfaces of the aircraft 100, the motor 120 and propeller 122 attachments may be modularly attached to the fuselage 102 as well. The propeller connection assembly is the subject of a patent application 62/382,698 filed on 1 Sep. 2016, all of which is incorporated herein by reference. The ability to change the motor 120 may be useful for adapting the aircraft 100 for a particular mission such as a high speed mission requiring a fast motor 120 and fast propeller 122. Such an arrangement may use too much fuel/battery for a different mission, and therefore require the user to utilize a slower, more fuel efficient motor 120 and propeller 122 arrangement.

The connector of the motor 120 to the fuselage 102 by the motor connector 124 could be any kind of attachment such as but not limited to a slide, snap, magnetic, screw, click or other connector type. Such a connector may allow for a tool-free connect and disconnection to the fuselage 102. By using a tool-free solution, the user is not required to carry and potentially lose tools, fasteners, or other loose items when in the field with the aircraft.

It should be noted that the motor 120 used in the example embodiments here could include any kind of motor including a battery operated electric motor, an internal combustion gasoline powered motor, or other kind of motor.

Short Landing Examples

In some example embodiments, the aircraft 100 in FIG. 1 may include a motor 120 that allows for reverse spin of the propeller 122. Such a reverse thrust can be utilized by a user to slow the aircraft 100 quickly, which may be useful in a short landing situation, thus necessitating a relatively short runway for landing.

The ability of the motor 120 to reverse spin/reverse thrust may be built into the motor 120 and utilized at a particular time in the landing sequence. Such a sequence may include input from onboard computer with a processor, memory, data storage and communication with a wireless control station by an antenna. The wireless control may be from any of various wireless radio arrangements such as but not limited to a short range communication system such as WiFi, Bluetooth Low Energy, infra-red or other communication system, cellular communications, long range radio communications, satellite communications. Alternatively or additionally, some embodiments include the onboard computer in communication with any of various peripherals or instruments on the aircraft 100 such as but not limited to an airspeed detector such as with a pitot tube; any number of accelerometers; gyros; an atmospheric altimeter; a distance measuring device such as a radar altimeter, a laser altimeter, a light based (such as LIDAR) altimeter; a location detection device such as a satellite navigation/location system global positioning system (GPS).

Using such systems, at a particular geographic position or a particular altitude above ground, and/or airspeed the aircraft 100 motor 120 could reverse thrust and slow down to decrease the runway needed to land. Some embodiments also include a wind estimation system to determine the best direction to land. In such examples, accelerometers and geographic positioning systems may be used to determine prevailing wind direction and speed during flight. Using the prevailing wind information, the aircraft 100 may land into the wind, thereby decreasing landing distance, and increasing a stabilized flight regime.

Adaptable Payload Examples

Figure 2:
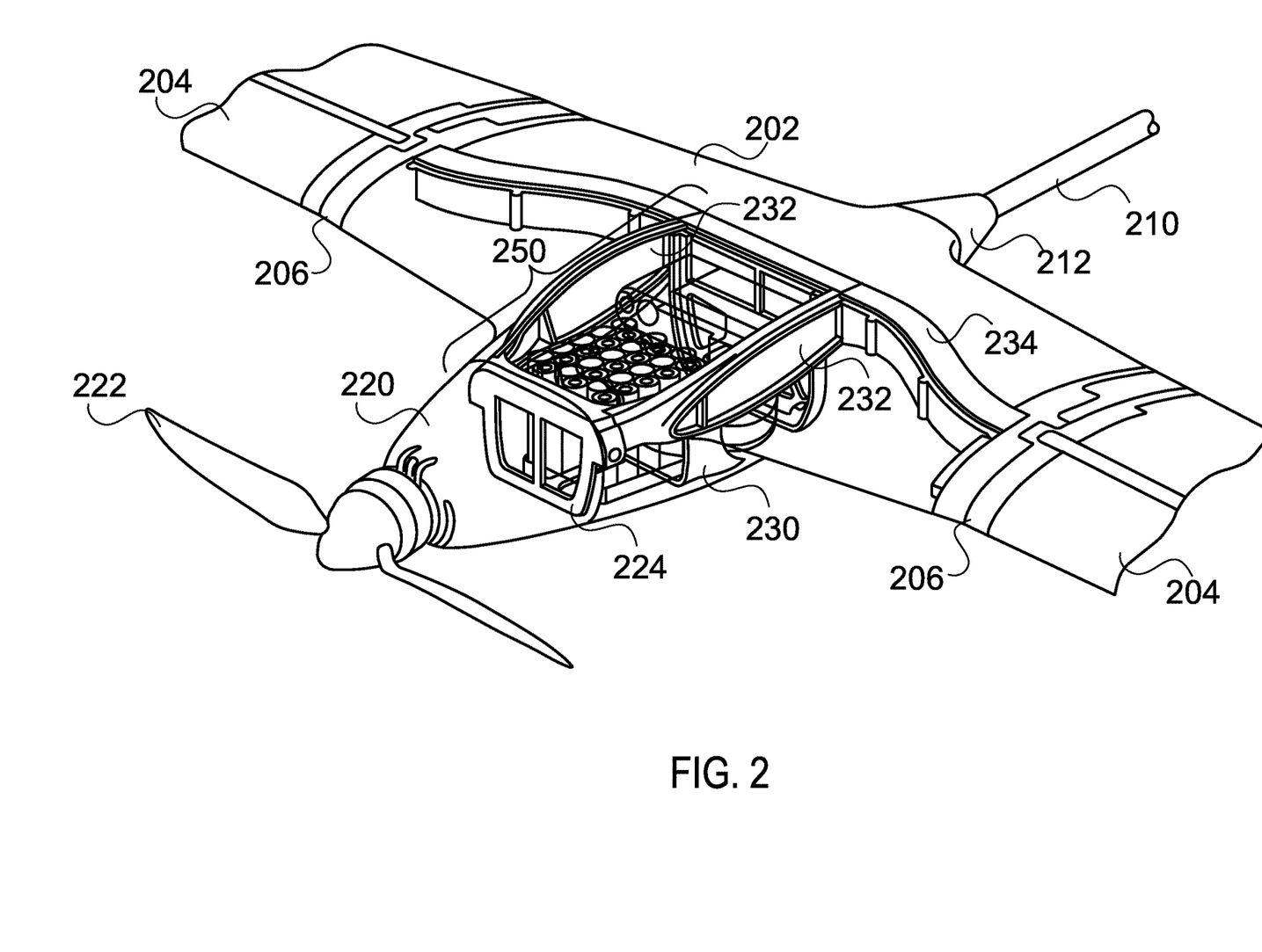
FIG. 2 is a perspective illustration of a fuselage payload section according to some embodiments described here.

FIG. 2 shows a perspective cutaway of the main fuselage 202 section. The fuselage 202 is shown coupled to the two wing sections 204 by their associated wing connectors 206. The tail connector 212 is shown connecting the tail boom 210 and the motor connector 224 is shown connected to the motor 220 and thereby the propeller 222 assembly.

The fuselage 202 is centered around a main transverse support yoke 234 coupled to a U-shaped frame 232. This combination of the yoke 234 and frame 232 form the main payload section 250 of the fuselage 202. The yoke 234 spans the main fuselage 202 section and is connected in the example, to the two wing connectors 206. In this way, the yoke 234 is the main transverse structural element across the fuselage 202.

The U-shaped frame 232 is shown in the example, coupled to or connected to the yoke 234. This U-shaped frame 232 is shown attached to the front of the yoke 234 in the example, that is, toward the motor 220 and propeller 222. It should be noted that other embodiments may include a U-shaped frame 232 which is aft of the yoke 234 and thereby facing the tail section 212, 210 of the fuselage 202. Alternatively or additionally, the yoke 234 may include two U-shaped frames 232 which attach to both the forward and aft sections of the yoke 234, toward both the front and rear of the aircraft. Any of various configurations of frame components may therefore be assembled around the main yoke 234 spanning the fuselage 202.

In some example embodiments, the U-shaped frame 232 as shown in FIG. 2 also includes a cargo supporting bracket 230 that spans the width of the U-shaped frame 232. This bracket 230 reaches below the main U-shaped frame 232 and can help support the payload as described herein. Inside the U-shaped frame 232 any number of payload securing devices could be mounted or integrated into the frame. Such features such as hooks, snaps, straps, cords, clasps, elastomeric cords, tie downs, eyelets, cleats, baskets, meshes, fences, lids, covers, arms, or other device could be integrated or mounted. Such features could be used to secure any kind of payload that could fit into the payload 250 U-shaped frame 232 section.

The material used to make the structural components such as the yoke 234 and the U-shaped frame 232 could be any of various materials, the same as one another or different. Such materials could include but are not limited to plastics, metals such as aluminum, steel, titanium, carbon fibers, foams such as polystyrene, fiberglass, wood, cardboards, resins or other material. The structural components may be rigid or may include some amount of flexibility to the airframe to aid in impact resistance and survivability. Shock absorbing devices may be fitted into and between structural components such as shock absorbing gels fitted between parts.

Figure 3:
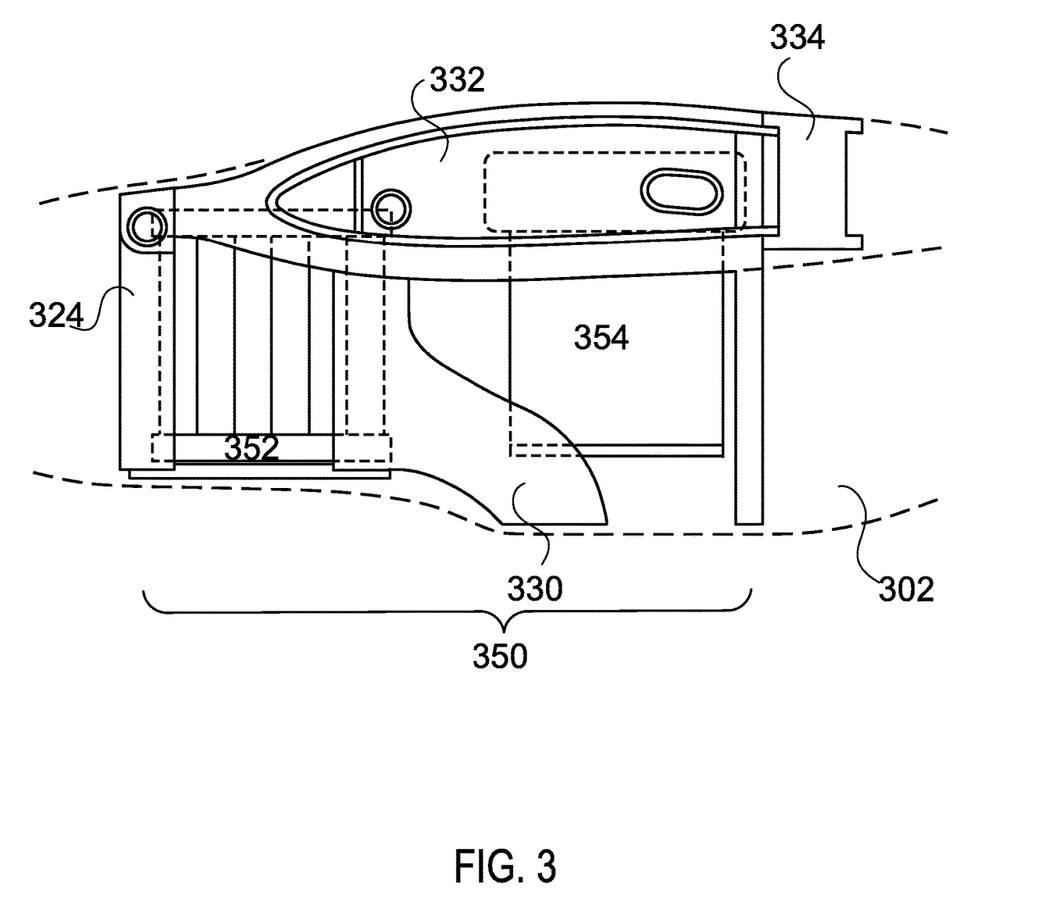
FIG. 3 is a side cut away view of a fuselage payload according to some embodiments described here.

FIG. 3 shows a side cut away view of the payload section 350 of the airframe. The main yoke 334 is shown in a cut away, perpendicular to the fuselage 302 and attached to the U-shaped frame 332. The motor connector 324 section is shown at the forward most section of the U-shaped frame 332. In some embodiments, the U-shaped frame 332 includes a cargo supporting bracket 330. This bracket 330 may span the breadth of the U-shaped frame 332 and provide structural support for the payload section 350 of the airframe. It may also be used to hold or support the payload. In the example, batteries 352 and a camera 354 are shown in the payload but any kind of payload could be loaded.

Figure 4:
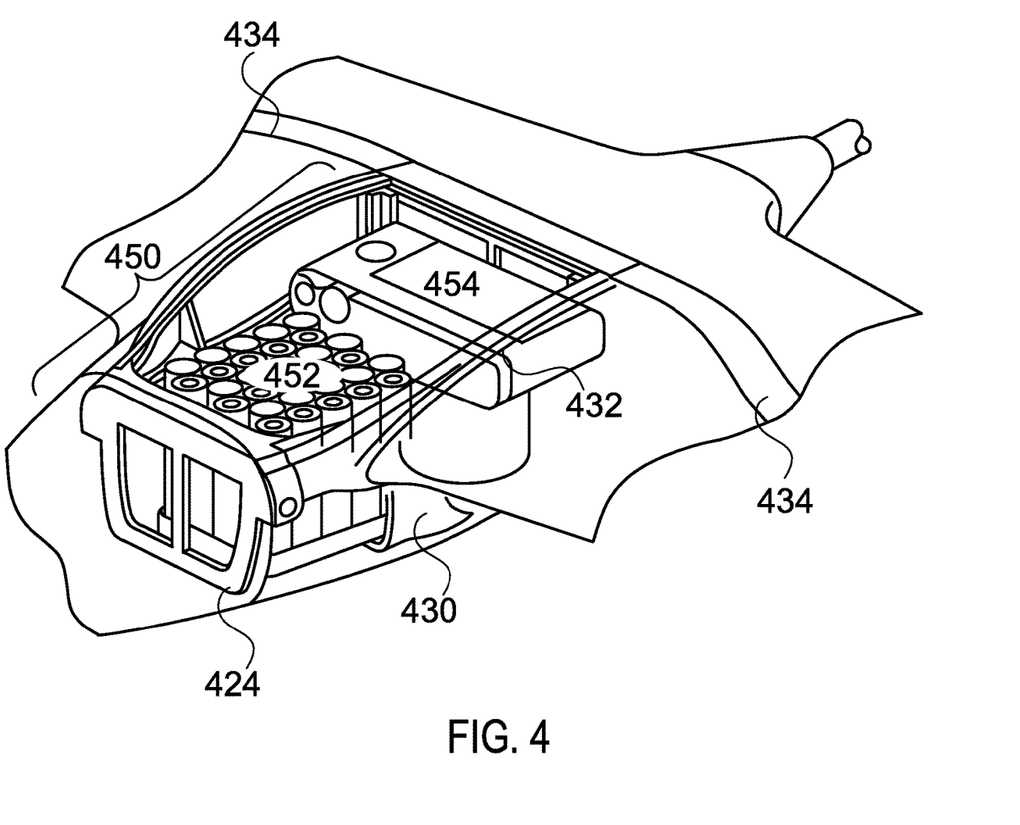
FIG. 4 is another perspective illustration of a fuselage payload section according to some embodiments described here.

FIG. 4 shows another perspective drawing of an example payload 450 section of the overall airframe. In the example, the yoke 434 is shown as is the U-shaped frame 432 and the motor connector 424 section. The bracket 430 is also shown in the payload section 450 spanning the U-shaped frame 432.

The perspective diagram of FIG. 4 shows how any of various payloads may be held in the payload section 450 of the airframe. In the example of FIG. 4, batteries 452 are shown in the payload along with a camera 454. As described herein, any kind of cargo may be secured in the payload section 450 and is not limited to batteries 452 and a camera 454.

Figure 5:
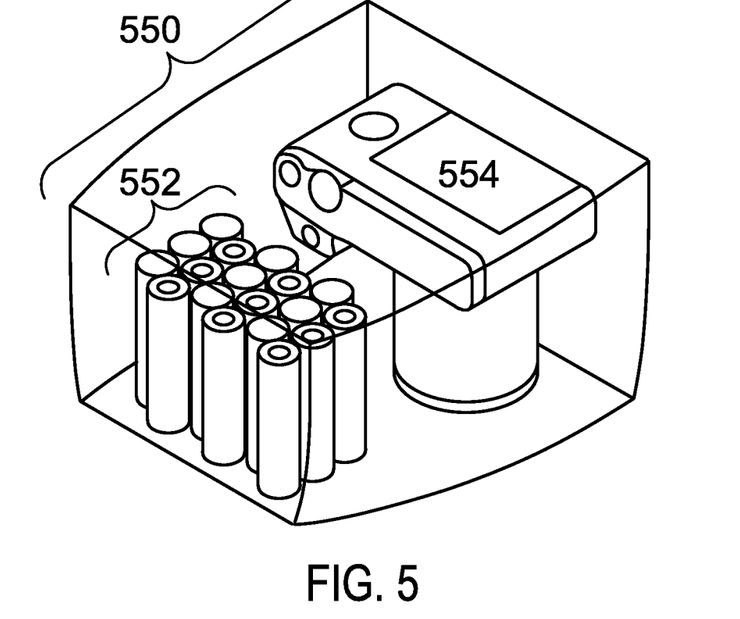
FIG. 5 is a perspective view of payload options according to some embodiments described here.
Figure 6:
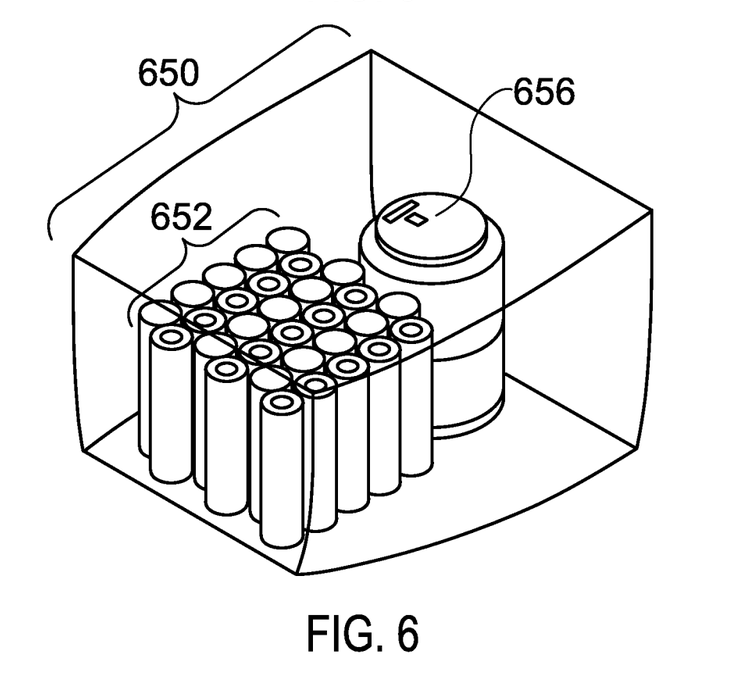
FIG. 6 is another perspective view of payload options according to some embodiments described here.

FIGS. 5 and 6 show how the payload section 550, 650 of the airframe may include a variety of payloads. FIG. 5 shows a payload 550 with a larger camera 554 and a smaller battery pack 552. FIG. 6 shows a payload 650 with a radar 656 and a larger battery pack 652. In some example embodiments, the interface of the battery pack 552, 652 and the airframe may be located at the forward most section of the U-shaped frame and in some examples, on the motor connector. In such examples, placing the battery interface at one end of the payload section 550, 650 may allow for differently sized and shaped battery packs to be loaded into the aircraft, depending on the mission and the other payload that the aircraft is carrying.

Figure 7:
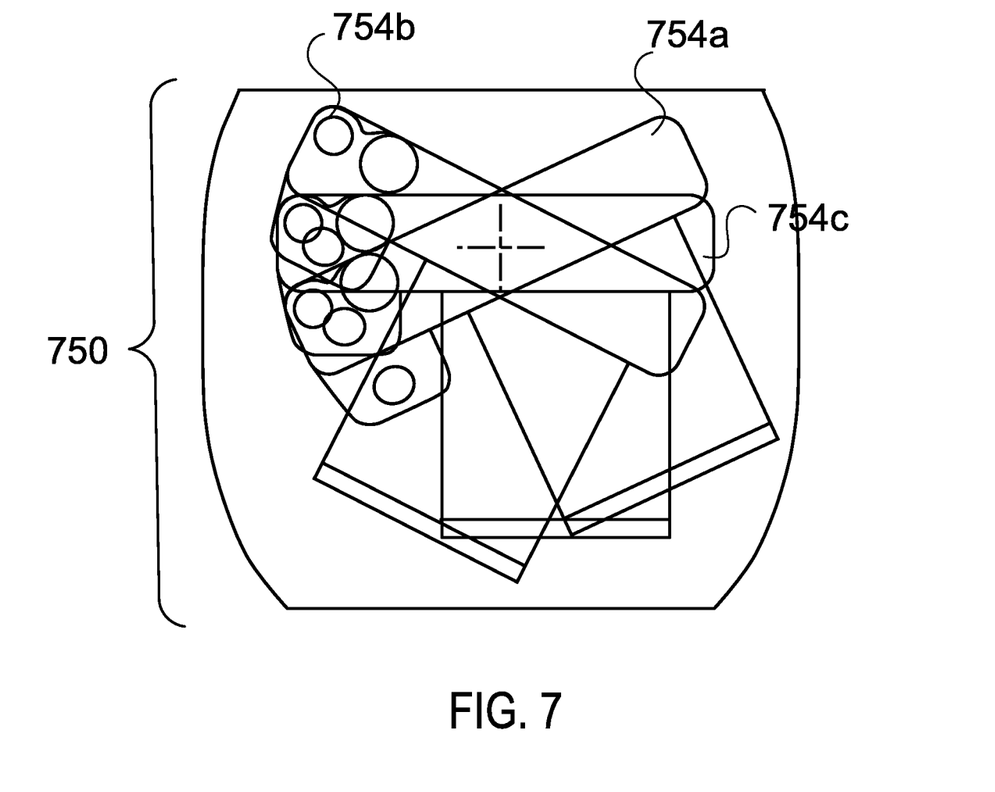
FIG. 7 is another perspective view of payload options according to some embodiments described here.

FIG. 7 shows a side cut away view of the payload section 750 of the airframe with a camera 754a loaded. The example in FIG. 7 shows how any kind of payload, in this case a camera 754a could be mounted in any of various orientations 754b, 754c within the payload section 750. In a camera example, a gimbal may be placed into the payload section 750 to allow for mounting and movement of an item such as a camera 754a in the payload 750. Servo motors on such a gimbal may pivot the payload such as a camera 754a while in operation. Also, remote operation of items in the payload 750 may be configured. For example, the camera 754a may not only pivot on a gimbal, but shoot, focus, zoom, change settings, and turn on and off by remote operation. Such remote operation may include a user interface at the remote control station. The example of a camera 754a in the example payload 750 is not intended to be liming. Any number of various payload items may be loaded into the payload section 750 and even operated remotely. Such items include but are not limited to a video camera, radar, infrared camera, laser range finder, communications antennae, gas sniffer, radiation detector, explosives detector, speaker, microphone, or other device.

Direct Flight Control Surface Examples

Figure 8:
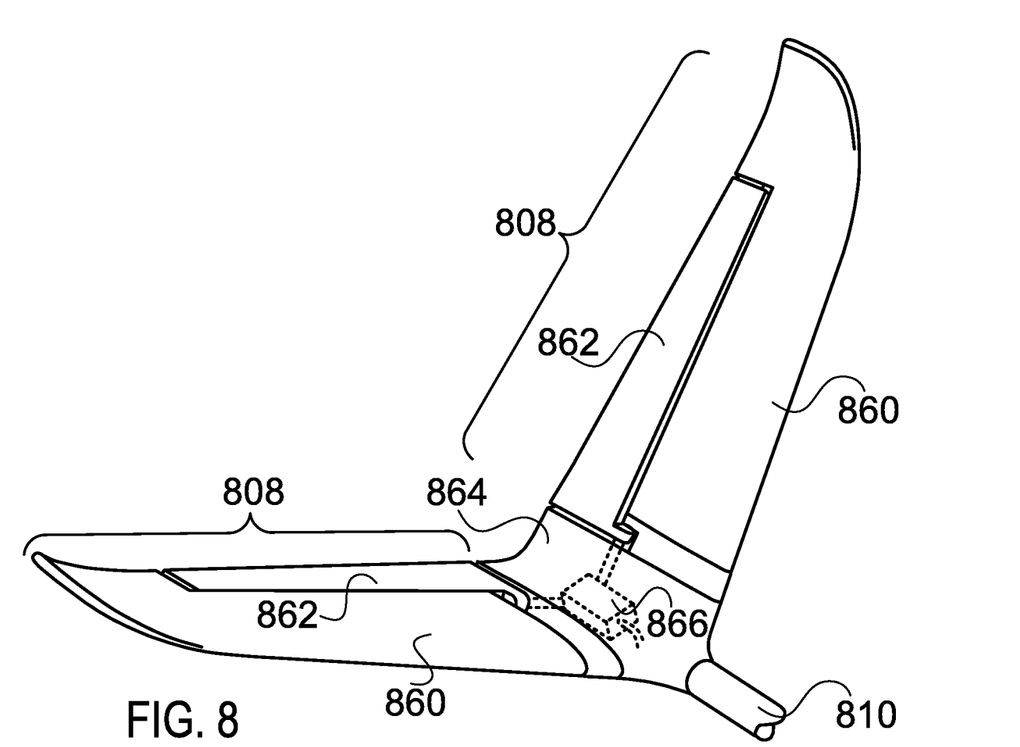
FIG. 8 is a perspective illustration of an aircraft tail section according to some embodiments described here.

FIG. 8 shows a perspective of an example embodiment tail section 800. The example tail section 800 is connected to a tail boom 810 and thereby, the body of the airframe fuselage (not pictured). The example tail section 800 shown in FIG. 8 includes a Y-shaped combination elevator/rudder arrangement instead of a vertical and horizontal stabilizer which may be used in other example embodiments. Each side of the elevator/rudder 808 example in FIG. 8 is made up of two component parts, a fixed leading edge surface 860 and a movable flight control surface 862. The two portions of the tail are shown in the example, as connected by a fulcrum 864. In the example of FIG. 8, the fulcrum section 864 of the tail includes at least one servo motor(s) 866 which is connected to the movable flight control surfaces 862. The servo motor(s) 866 may be wired to the main fuselage section, or may be wirelessly configured to the fuselage section. The servo motor(s) may be in communication with the onboard computer and receive and/or send data to the onboard computer in a wired or wireless manner.

The example fixed leading edge surface 860 and a movable flight control surface 862 in FIG. 8 may be made of any kind of material including foam, plastic, carbon fiber, fiberglass, metal, composites, or a combination of these. In some examples, a rigid tube made of carbon fiber or metal may be placed inside the fixed leading edge surface 860 and a movable flight control surface 862 to enhance rigidity and improve stability of the flight surfaces. In such examples, these tubes may be fixed or inserted into the fulcrum 864 section and the flight surfaces may be slid onto the tube and affixed to the fulcrum 864 for operation. In some examples, instead of a tube, the rigid structure may be a tab, a flat stick, a hollow tube, a solid dowel, or any shaped rigid member. In some examples, the rigid member may be a flat fin that extends from the fulcrum 864 upon which the flight surfaces may be slid through an opening or otherwise attach to.

Figure 9:
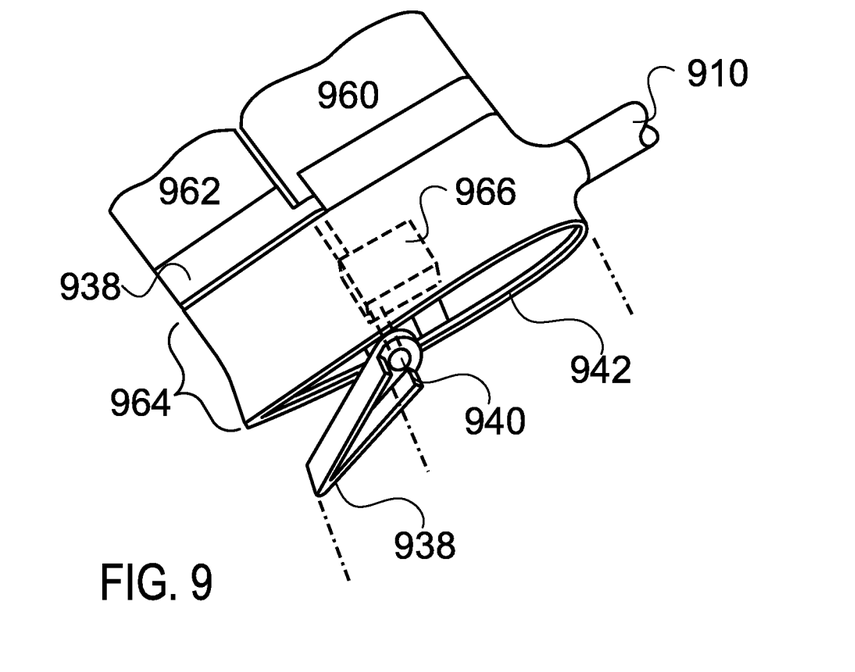
FIG. 9 is a perspective illustration detail of an aircraft tail section flight control surface according to some embodiments described here.

FIG. 9 shows a detail of one of the tail fulcrum section 964. The example of FIG. 9 shows the fixed leading edge surface 960 which can connect to the edge of the fulcrum 942 and a paddle 938 connected to the servo motor 966 in the fulcrum 964. The paddle 938 in the example may take the shape of the movable flight control surface 962 and be directly connected to the servo motor 966 at an axle 940. The movable flight control surface 962 may attach to the paddle 938 to allow the movable flight control surface 962 to move in operation when the servo motor(s) 966 rotates or otherwise operates. The end of the movable flight surface 962 opposite to the paddle 938 may be connected to the fixed leading edge surface 960 by a pivot axis (not shown). In this way, the servo motor 966 may control the movement of the entire movable flight control surface 962 directly by the paddle 938. In this way, there is no linkages, wires, or other lengthy connections running the flight control surfaces, instead, the servo motors are directly in control of the movable flight control surfaces.

It should be noted that FIG. 8 and FIG. 9 depict a tail section example, but similar arrangements could be made on the wings. In such examples, servo motors could be mounted into the wings, either free wing structure or wing roots attached to the fuselage, and the servo motors could be mounted to paddles and thereby movable flight control surfaces such as ailerons and/or flaps.

Tail Connection Examples

FIGS. 10a and 10b show example cut away illustrations of embodiments of the tail boom 1010 connecting to the tail connector 1012 as described above. In FIG. 10a, the tail boom 1010 and tail connector 1012 are detached but lined up for connection. In FIG. 10b, the tail boom 1010 and tail connector 1012 are coupled or otherwise attached for operation. The tail connector 1012 in some embodiments is connected to the fuselage as shown in FIG. 2 above. The tail boom 1010 is connected to the flight control surfaces as shown in FIG. 8 and FIG. 9 above.

In the example embodiment of FIG. 10a, the tail boom 1010 is shown with two resilient tabs 1070 on either side of the end of the tail boom 1080. The resilient tabs 1070 are configured to attach to the tail boom 1010 and extend away from it in a resilient manner that is flexible but biased to return to its original shape. In some embodiments, the resilient tabs 1070 are made of plastic or other semi-flexible material. In some embodiments, a living hinge is formed between the resilient tab 1070 and the tail boom 1010. In some embodiments, the tab is spring loaded (not shown) and biased away from the tail boom 1010 so that it is able to be pushed in by a user but springs outward when resting.

It should be noted that any number of resilient tabs 1070 could be included on the tail boom 1010 such as one, two, three, four, or other number. It should also be noted that the resilient tabs 1070 need not be in the same place on the tail boom 1010 but could be staggered in different sections. For example, two tabs could be as shown in FIG. 10a and two more could be positioned further toward the end of the tail boom 1080 and perpendicular to those shown in FIG. 10a. In such examples, any number of resilient tabs could be placed around the tail boom 1010 to attach to the tail connector.

It should also be noted that the shape of the resilient tabs 1070 need not be limited to the shapes shown in FIGS. 10a and 10b. Any number of shapes could be used to mate with the tail connector 1012 as described herein including square, round, rectangular, triangular or other shape. In some embodiments, the resilient tabs 1070 are wedge shaped in order to aid connection with the tail connector 1012 section.

The tail connector 1012 includes in the example of FIG. 10a a cavity 1084 that is shaped to receive the end of the tail boom 1010. In the example embodiment, the walls of the cavity 1084 include a matching number of holes 1072 as the number of resilient tabs 1070 on the tail boom. When coupled, as shown in FIG. 10b, the resilient tabs 1070 of the tail boom 1010 fit into the holes 1072 and snap into place, thereby securing the tail boom 1010 in the cavity 1084.

The tail connector 1012 also includes push tabs 1076 for each hole 1072 to detach the tail boom 1010 from the tail connector 1012. The push tabs 1076 like the resilient tabs 1070 on the tail boom 1010 may be resiliently attached by a living hinge to the tail connector 1012. In this way the push tabs 1076 may be deflected by a user inward, toward the cavity 1084 of the tail connector 1012 and toward or through the holes 1072 in the tail connector 1012 cavity 1084 to interact with the resilient tabs 1070 of the tail boom 1010 in order to deflect the resilient tabs 1070 inward, out of the holes 1072, and allow the tail boom 1010 to slide out and detach from the tail connector 1012.

In some embodiments, the tail connector 1012 cavity 1084 includes an electrical connector 1074 that is configured to mate with the end of the tail boom 1080 and electrically connect the fuselage and the tail sections of the overall airframe. In such a way, an onboard computer or other device that communicates electrically may communicate with the flight control surfaces in the tail section during operation. Similarly, such an electrical connection may allow a battery in the fuselage to power motors on the tail flight control surfaces. Other peripherals may be operated in the same manner. The electrical connector 1074 in the tail connector 1012 cavity 1084 may also include a cushion or other spring feature to help mate the tail boom 1010 to the tail connector 1012.

FIG. 10b shows an illustration of an example embodiment of the tail boom 1010 mated with the tail connector 1012. In the illustration it can be seen that the resilient tabs 1070 are seated inside the holes 1072 of the tail connector 1012 cavity which is filled with the tail boom 1010. The seated resilient tabs 1070 exert an outward force on the walls of the holes 1072 and thereby hold the tail boom 1010 into the tail connector 1012. If a force were to pull the tail boom 1010 to try and remove it from the tail connector 1012 in this position, the resilient tabs 1070 in the holes 1072 would hold the tail boom 1010 in place.

To detach the tail boom 1010 from the tail connector 1012, a user could push the push tabs 1076 of the tail connector 1012 which are shown aligned with the resilient tabs 1017 on the tail boom 1010. Such a push on the push tabs 1076 would deflect the push tabs 1076 toward the center of the tail connector 1012 cavity, the push tabs 1076 would contact the resilient tabs 1070 and deflect them, thereby unseating them from the holes 1072 and allowing the tail boom 1010 to be slid out of the tail connector 1012.

FIG. 10b shows the tail connector 1012 electrical connector 1074 in contact with the end of the tail boom 1080 providing an electrical connection between the two parts.

It should be noted that the examples described in FIGS. 10a and 10b of a tail section are not intended to be limiting. Any aspect of an example airframe could be detachably connected in a similar manner as described here for the tail boom. For example, motor mounts, propeller assemblies, fuselage peripherals, payload attachments, or other parts may be equipped with a similar detachable connection assembly.

CONCLUSION

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles of the embodiments and its practical applications, to thereby enable others skilled in the art to best utilize the various embodiments with various modifications as are suited to the particular use contemplated.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although some presently preferred implementations of the embodiments have been specifically described herein, it will be apparent to those skilled in the art to which the embodiments pertains that variations and modifications of the various implementations shown and described herein may be made without departing from the spirit and scope of the embodiments. Accordingly, it is intended that the embodiments be limited only to the extent required by the applicable rules of law.

What is claimed is:

1. An unmanned aerial vehicle, comprising:
   a fuselage;
   first and second wing sections configured for detachable connection to the fuselage via wing connectors positioned between the fuselage and the first and second wing sections, the first and second wing sections each having a structural component that runs in transverse relation to a length of the unmanned aerial vehicle when connected to the fuselage via the wing connectors;
   a yoke connected to the wing connectors and extending internally within the fuselage in transverse relation to a length of the unmanned aerial vehicle, wherein the yoke aligns with the structural components of the first and second wing sections when the first and second wing sections are connected to the fuselage via the wing connectors to form a continuous primary structural element across the fuselage and the first and second wing sections;
   a payload section directly connected to the yoke such that the payload section extends forwardly therefrom;
   a motor connector positioned at a forward end of the payload section such that the motor connector is spaced from the yoke along the length of the unmanned aerial vehicle;
   a tail including a tail boom connected at one end to the fuselage and detachably coupled to a tail connector, wherein the tail boom is configured with multiple resilient tabs and the tail connector includes a cavity that is shaped to receive the tail boom with a matching hole for each of the multiple resilient tabs.

2. The unmanned aerial vehicle of claim 1, further comprising a motor detachably connected to the motor connector.

3. The unmanned aerial vehicle of claim 1, further comprising a frame extending forwardly from the yoke such that the yoke, the frame, and the motor connector collectively define the payload section.

4. The unmanned aerial vehicle of claim 3, wherein the frame includes first and second frame members spaced transversely from each other along a width of the unmanned aerial vehicle.

5. The unmanned aerial vehicle of claim 3, further including a payload support bracket spanning the frame and located between the yoke and the motor connector.

6. An unmanned aerial vehicle, comprising:
a fuselage;
first and second wing sections connected to the fuselage via respective first and second wing connectors, the first and second wing sections each having a structural component;
a yoke having a first and second ends end respectively connected to the first and second wing connectors, wherein the yoke extends internally within the fuselage along a width of the unmanned aerial vehicle and aligns with the structural components of the first and second wing sections to form a continuous primary structural element across the fuselage and the first and second wing sections when the first and second wing sections are connected to the fuselage via the wing connectors;
a frame directly attached to and extending forwardly from the yoke such that the yoke and the frame collectively define a payload section;
a propeller assembly located at a forward end of the unmanned aerial vehicle; and
a tail including a tail boom connected at one end to the fuselage and detachably coupled to a tail connector, wherein the tail boom is configured with multiple resilient tabs and the tail connector includes a cavity that is shaped to receive the tail boom with a matching hole for each of the multiple resilient tabs.

7. The unmanned aerial vehicle of claim 6, wherein the payload section is directly connected to a forward portion of the yoke.

8. The unmanned aerial vehicle of claim 6, wherein the frame includes discrete first and second frame members.

9. The unmanned aerial vehicle of claim 8, wherein the first and second frame members are spaced transversely from each other along the width of the unmanned aerial vehicle.

10. The unmanned aerial vehicle of claim 6, further comprising a motor connector positioned at a forward end of the payload section such that the motor connector is spaced from the yoke along a length of the unmanned aerial vehicle.

11. The unmanned aerial vehicle of claim 10, wherein the motor connector extends transversely in relation to the frame.

12. The unmanned aerial vehicle of claim 10, further comprising a motor detachably connected to the motor connector.

13. The unmanned aerial vehicle of claim 10, further including a payload support bracket spanning the frame.

14. The unmanned aerial vehicle of claim 13, wherein the payload support bracket extends beneath the payload section.

15. The unmanned aerial vehicle of claim 13, wherein the payload support bracket is located between the yoke and the motor connector.

16. An unmanned aerial vehicle, comprising:
a fuselage;
an internal structural component extending transversely within the fuselage;
wing connectors connected to opposite ends of the internal structural component and configured to releasably connect wing sections of the unmanned aerial vehicle to the fuselage, wherein the wing sections each have a structural component that connects with the wing connectors and aligns with the internal structural component of the unmanned aerial vehicle when connected to form a continuous primary structural element across the fuselage and the wing sections when the wing sections are connected;
a payload section directly connected to a forward portion of the internal structural component such that the payload section extends along a length of the unmanned aerial vehicle;
a propeller assembly located at a forward end of the unmanned aerial vehicle;
a tail including a tail boom connected at one end to the fuselage and detachably coupled to a tail connector, wherein the tail boom is configured with multiple resilient tabs and the tail connector includes a cavity that is shaped to receive the tail boom with a matching hole for each of the multiple resilient tabs.

17. The unmanned aerial vehicle of claim 16, further comprising a camera located within the payload section.

18. The unmanned aerial vehicle of claim 16, further comprising a motor connector secured to a forward end of the payload section such that the motor connector is spaced from the internal structural component along the length of the unmanned aerial vehicle.

19. The unmanned aerial vehicle of claim 18, further comprising a frame extending between the internal structural component and the motor connector.

20. The unmanned aerial vehicle of claim 19, wherein the frame includes first and second frame members extending forwardly from the internal structural component, the first and second frame members being spaced transversely from each other along a width of the unmanned aerial vehicle.

* * * * *